US009685715B2

(12) United States Patent
Yamauchi et al.

(10) Patent No.: US 9,685,715 B2
(45) Date of Patent: Jun. 20, 2017

(54) TERMINAL TABLE AND TERMINAL TABLE UNIT

(71) Applicant: TOYOTA JIDOSHA KABUSHIKI KAISHA, Toyota-shi, Aichi-ken (JP)

(72) Inventors: Yuji Yamauchi, Hikone (JP); Hideki Nakazato, Hikone (JP); Hiroyukl Sekine, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/935,876

(22) Filed: Nov. 9, 2015

(65) Prior Publication Data

US 2016/0141772 A1 May 19, 2016

(30) Foreign Application Priority Data

Nov. 14, 2014 (JP) .................................. 2014-232078

(51) Int. Cl.
*H01R 9/22* (2006.01)
*H01R 9/24* (2006.01)
(Continued)

(52) U.S. Cl.
CPC ................ *H01R 9/24* (2013.01); *B60L 11/18* (2013.01); *H01M 8/04574* (2013.01);
(Continued)

(58) Field of Classification Search
CPC ...................................................... H01R 9/24
(Continued)

(56) References Cited

U.S. PATENT DOCUMENTS 4,002,388 A * 1/1977 Menocal .................. H02B 1/21
 174/72 B
4,097,103 A * 6/1978 Krause ..................... H02G 5/08
 174/88 B
(Continued)

FOREIGN PATENT DOCUMENTS

JP 09-283199 10/1997
JP 2004-327184 11/2004
(Continued)

OTHER PUBLICATIONS

Office Action issued in Korean Application No. 10-2015-0150010 on Mar. 10, 2017.

*Primary Examiner* — Tulsidas C Patel
*Assistant Examiner* — Peter G Leigh
(74) *Attorney, Agent, or Firm* — Finnegan, Henderson, Farabow, Garrett & Dunner, LLP

(57) ABSTRACT

Provided are a terminal table and a terminal table unit allowing a plurality of busbars to be connected certainly and easily with reactor busbars of reactor securing members that are connected with reactors included in reactor units having an error. A sensor terminal table 30 includes a plurality of sensor busbars 40 and a sensor-attached holding body holding the plurality of sensor busbars 40. The sensor busbars 40 each include a reactor-side connection portion 40a on the bottom side in a height direction H and a top connection portion 40b on the top side in the height direction H. The reactor-side connection portion 40a is connectable with a reactor re, and the top connection portion 40b is connectable with an IPM or a fuel cell FC. At least one of the plurality of sensor busbars 40 is a movable busbar 41 or 43 attached to the sensor-attached holding body 31 so as to be movable in the height direction H with respect to the sensor-attached holding body 31. The movable busbar 41 or 43 has the
(Continued)

reactor-side connection portion 40*a* connectable with the reactor re.

12 Claims, 7 Drawing Sheets

(51) Int. Cl.
 *B60L 11/18* (2006.01)
 *H01M 8/2465* (2016.01)
 *H01M 8/04537* (2016.01)
(52) U.S. Cl.
 CPC .......... *H01M 8/2465* (2013.01); *H01R 9/226* (2013.01); *H01M 2250/20* (2013.01)
(58) Field of Classification Search
 USPC ................ 439/212, 213; 174/72 B; 361/624, 361/648–650
 See application file for complete search history.

(56) References Cited

U.S. PATENT DOCUMENTS

| | | | | |
|---|---|---|---|---|
| 4,755,145 A * | 7/1988 | Johnson | ............... | H05K 7/1457 439/101 |
| 4,867,696 A * | 9/1989 | Demler, Jr. | ............ | H02G 5/005 174/72 B |
| 5,011,421 A * | 4/1991 | Duke | ........................ | H02G 5/06 174/71 B |
| 5,055,059 A * | 10/1991 | Logstrup | .................. | H02B 1/21 174/72 B |
| 5,160,274 A * | 11/1992 | Ozaki | .................. | H01R 9/2458 439/212 |
| 5,196,987 A * | 3/1993 | Webber | .................. | H01R 25/16 361/624 |
| 5,329,424 A * | 7/1994 | Patel | ...................... | H02G 5/025 174/72 B |
| 5,969,308 A * | 10/1999 | Pever | ........................ | H01H 1/42 200/15 |
| 6,848,953 B2 * | 2/2005 | Schell | .................. | H01R 13/055 439/825 |
| 7,713,097 B2 | 5/2010 | Eichhorst | | |
| 7,722,372 B2 * | 5/2010 | Matsumoto | ............ | H01R 13/42 174/68.2 |
| 8,096,814 B2 * | 1/2012 | Schell | .................... | H01R 13/11 439/79 |
| 8,134,070 B2 * | 3/2012 | Hirschfeld | ............... | H02B 1/20 174/133 B |
| 8,299,360 B2 * | 10/2012 | Sato | ........................ | H01R 9/24 174/50 |
| 8,480,419 B2 * | 7/2013 | Holbrook | ................ | B60R 25/00 174/72 B |
| 8,573,987 B1 * | 11/2013 | Schweitzer | ............ | H01R 9/226 439/457 |
| 8,717,741 B2 * | 5/2014 | Valenzuela | .......... | H01R 25/162 174/149 B |
| 8,859,897 B2 * | 10/2014 | Hadi | ...................... | H02G 5/005 174/68.2 |
| 2005/0090154 A1 * | 4/2005 | Ikeda | ..................... | H01R 9/245 439/709 |
| 2011/0073345 A1 * | 3/2011 | Sato | ........................ | H01R 9/24 174/50 |

FOREIGN PATENT DOCUMENTS

| | | |
|---|---|---|
| JP | 2010-33845 A | 2/2010 |
| JP | 2013-058387 | 3/2013 |
| JP | 2013-255395 | 12/2013 |
| KR | 10-2009-0014789 | 2/2009 |

* cited by examiner cross-sectional view taken along line A-A cross-sectional view taken along line B-B

TERMINAL TABLE AND TERMINAL TABLE UNIT

BACKGROUND OF THE INVENTION

1. Field of the Invention

The present invention relates to a terminal table and a terminal table unit mountable on a battery system usable in, for example, a fuel cell vehicle, a hybrid vehicle or the like.

2. Description of the Prior Art

For example, a battery system includes a plurality of circuits such as a boost circuit and the like. A module for control is connected with a battery, so that a conductive state at a predetermined voltage is guaranteed.

In order to provide such a plurality of circuits certainly and easily, a terminal table including a plurality of busbars each having a connection portion at each of two ends thereof as described in, for example, Patent Document 1 is widely used.

For example, the terminal table described in Patent Document 1 includes a plurality of busbars that connect a control device (Intelligent Power Module (IPM)) and a reactor to each other. When an error such as an installation error, a molding error or the like is caused to at least one of the control device (IPM) and the reactor, the plurality of busbars cannot be connected with certainty.

PRIOR ART DOCUMENT

Patent Document

Patent Document 1: Japanese Laid-Open Patent Publication No. 2013-255395

SUMMARY OF THE INVENTION

Problems to be Solved by the Invention

The present invention has an object of providing a terminal table and a terminal table unit that allow a plurality of busbars to be connected certainly and easily to a connection target to which an error is caused.

Means for Solving the Invention

The present invention is directed to a terminal table including a plurality of busbars each including a one-side connection portion provided on one side and connected with a first connection target and an other-side connection portion provided on the other side and connected with another connection target; and a holding body holding the plurality of busbars. At least one of the plurality of busbars is a movable busbar attached to the holding body so as to be movable in a first direction with respect to the holding body, the one-side connection portion of the movable busbar being connectable with the first connection target.

The connection between the connection targets and the connection portions is realized by connection jigs inserted therethrough, welding or caulking.

According to the invention, the plurality of busbars are connected certainly and easily with the connection target having an error.

This will be described in detail. In the case where circuits are formed by connecting the busbars with the connection targets having an error, the movable busbar attached to the holding body so as to be movable in the first direction with respect to the holding body may be moved in correspondence with the error. Owing to this, the busbars are connected easily.

In an embodiment of the invention, another busbar among the plurality of busbars may be a secured busbar attached to the holding body so as not to be movable; and the secured busbar may include an arm portion on the one side, the arm portion extending in a second direction crossing the first direction, being bendable in the first direction, and including the one-side connection portion at a tip thereof.

According to the invention, the plurality of busbars are connected more certainly and easily with the connection targets having an error.

This will be described in detail. In the case where circuits are formed by connecting the busbars with the connection targets having an error, the movable busbar attached to the holding body so as to be movable in the first direction with respect to the holding body may be moved in correspondence with the error, and also the arm portion of the secured busbar may be bent in correspondence with the error. Owing to this, the busbars are connected more easily and certainly. In the case where the movable busbar is moved with respect to the holding body, and the arm portion of the secured busbar is bent, in correspondence with the error of the connection target, the distance by which the movable busbar is moved or the amount by which the arm portion is bent is smaller than that in the case where the movable busbar is moved but the arm portion is not bent, or in the case where the arm portion is bent but the movable busbar is not moved. Therefore, the busbars are connected more easily and certainly.

In an embodiment of the invention, the one-side connection portion of the movable busbar and the one-side connection portion of the secured busbar may be connected with the first connection target to form a circuit.

According to the invention, the plurality of busbars are connected more certainly and easily with the connection target having an error, and circuits having a stable conductivity are realized.

This will be described in detail. As described above, in the case where circuits are formed by connecting the busbars with the connection target having an error, the movable busbar attached to the holding body so as to be movable in the first direction with respect to the holding body may be moved in correspondence with the error, and also the arm portion of the secured busbar may be bent in correspondence with the error. Owing to this, the busbars are connected more easily and certainly. Therefore, the connection portions are connected with the connection target without any load. Thus, circuits having a stable conductivity are realized.

In an embodiment of the invention, the other-side connection portion may be a connection through-hole allowing a connection jig to be inserted therethrough; and the connection through-hole of the movable busbar may be a lengthy hole that is lengthy in the first direction and runs through the movable busbar in a third direction different from the first direction and the second direction.

The term "connection jig" represents a concept encompassing a connection jig including a bolt and a nut, a bolt engageable with a female screw formed in a connection target, a nut engageable with a male screw included in a connection target, a caulking member and the like.

According to the invention, the plurality of busbars are connected more easily with the connection targets having an error.

This will be described in detail. Even in the case where both of the connection targets have an error or a connection target has an error in the arranging direction, the connection jigs are inserted through the lengthy holes to connect the connection targets and the busbars to each other certainly and easily.

In an embodiment of the invention, the holding body may include a current sensor measuring an electric current flowing in the busbar.

According to the invention, the electric current flowing in the busbar connected with the connection target is detected certainly with the sensor.

The present invention is directed to a terminal table unit including the above-described terminal table; and a through-terminal table including a plurality of through-busbars extending in a first direction and a through-busbar holding body holding the plurality of through-busbars. The plurality of through-busbars each include a through-piece inserted through the through-busbar holding body, and a through-busbar arm portion provided on one side with respect to the through-piece, the through-busbar arm portion extending in a second direction different from the first direction and being bendable in the first direction; and the through-piece includes an other-side connection portion on the other side, and the through-busbar arm portion includes a one-side connection portion at a tip thereof.

According to the invention, even in the case where the terminal table unit includes many circuits, the plurality of busbars are located without interference, and are connected easily and certainly with the connection targets having an error.

In an embodiment of the invention, the through-piece may include a protrusion rib protruding in a thickness direction, the protrusion rib being provided so as to be in a through-hole that is formed in the through-busbar holding body and allows the through-piece to be inserted therethrough; and the through-hole may have a protrusion portion protruding inward from an inner surface thereof.

According to the invention, the through-piece of the through-busbar is merely inserted through the through-hole of the through-holding body, so that the protrusion rib of the through-piece and the protrusion portion formed in the through-hole increase an insertion load. This prevents the through-piece from coming off from the through-hole.

In an embodiment of the invention, the terminal table unit may further include a to-be-connected terminal table including to-be-connected portions connected with the other-side connection portions of the busbars and the other-side connection portions of the through-busbars, and also including a connection busbar conductively connecting the to-be-connected portions and another connection target to each other.

According to the invention, the other-side connection portion is connected with the another connection target easily and certainly via the to-be-connected terminal table.

In an embodiment of the invention, the through-terminal table may be located on one side with respect to the terminal table, and the to-be-connected terminal table may be located on the other side with respect to the terminal table; and the holding body of the terminal table may have first-direction through-holes respectively allowing the through-pieces of the through-busbars to be inserted therethrough in the first direction.

According to the invention, the plurality of busbars are connected with the connection targets certainly and easily, and thus many circuits are formed in a compact manner.

This will be described in detail. The through-terminal table, the terminal table, and the to-be-connected terminal table, which connect the plurality of busbars with the connection targets certainly and easily, are located in this order from one side to the other side. In addition, the through-pieces are inserted through the first-direction through-holes formed in the holding body of the terminal table. Owing to this, the terminal table unit is compact.

Effect of the Invention

The present invention provides a terminal table and a terminal table unit that allow a plurality of busbars to be connected certainly and easily to a connection target to which an error is caused.

DESCRIPTION OF THE PREFERRED EMBODIMENTS

An embodiment of the present invention will be described with reference to the drawings.

Figure 1:
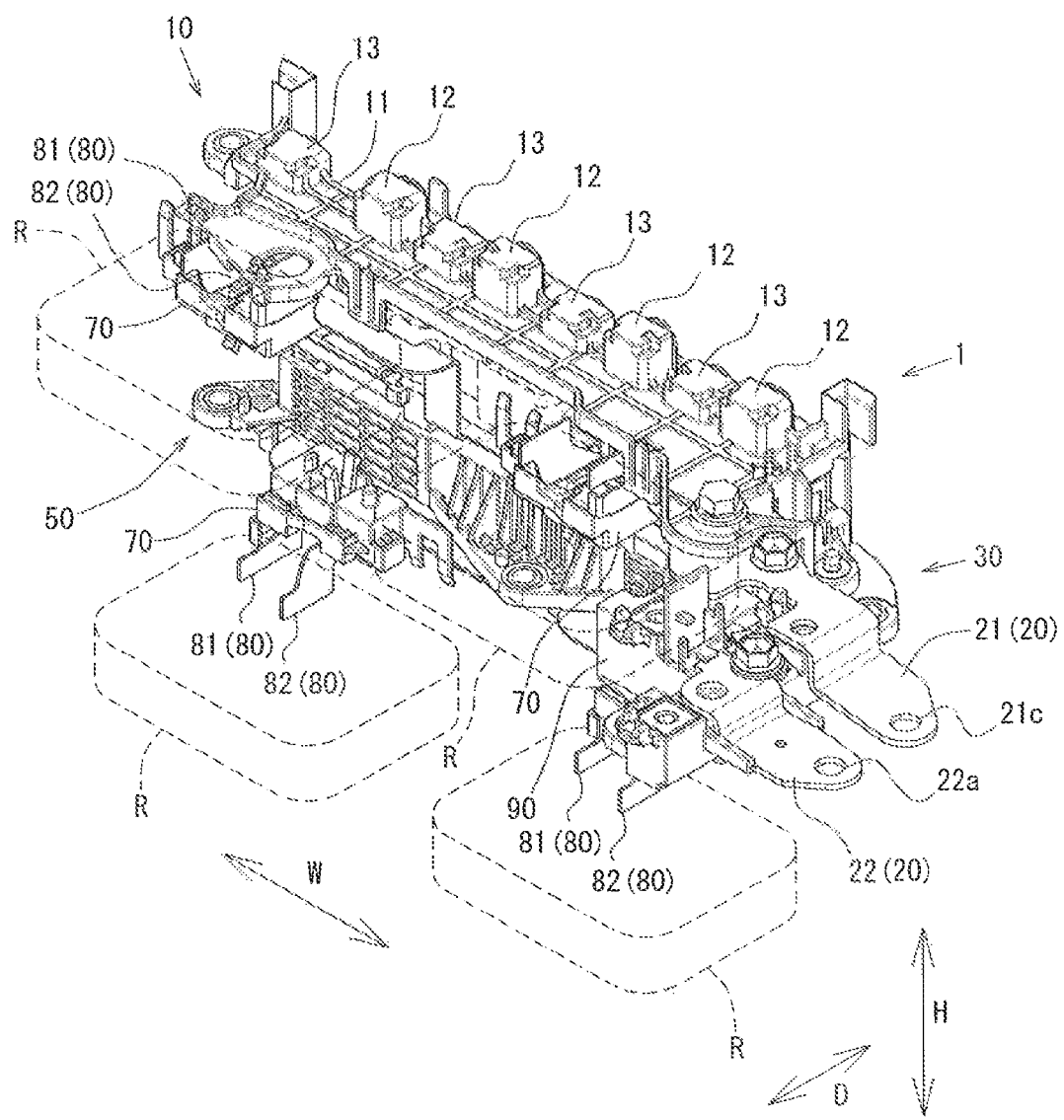
FIG. 1 is an isometric view showing a front surface, a top surface and a right side surface of a terminal table unit.
Figure 2:
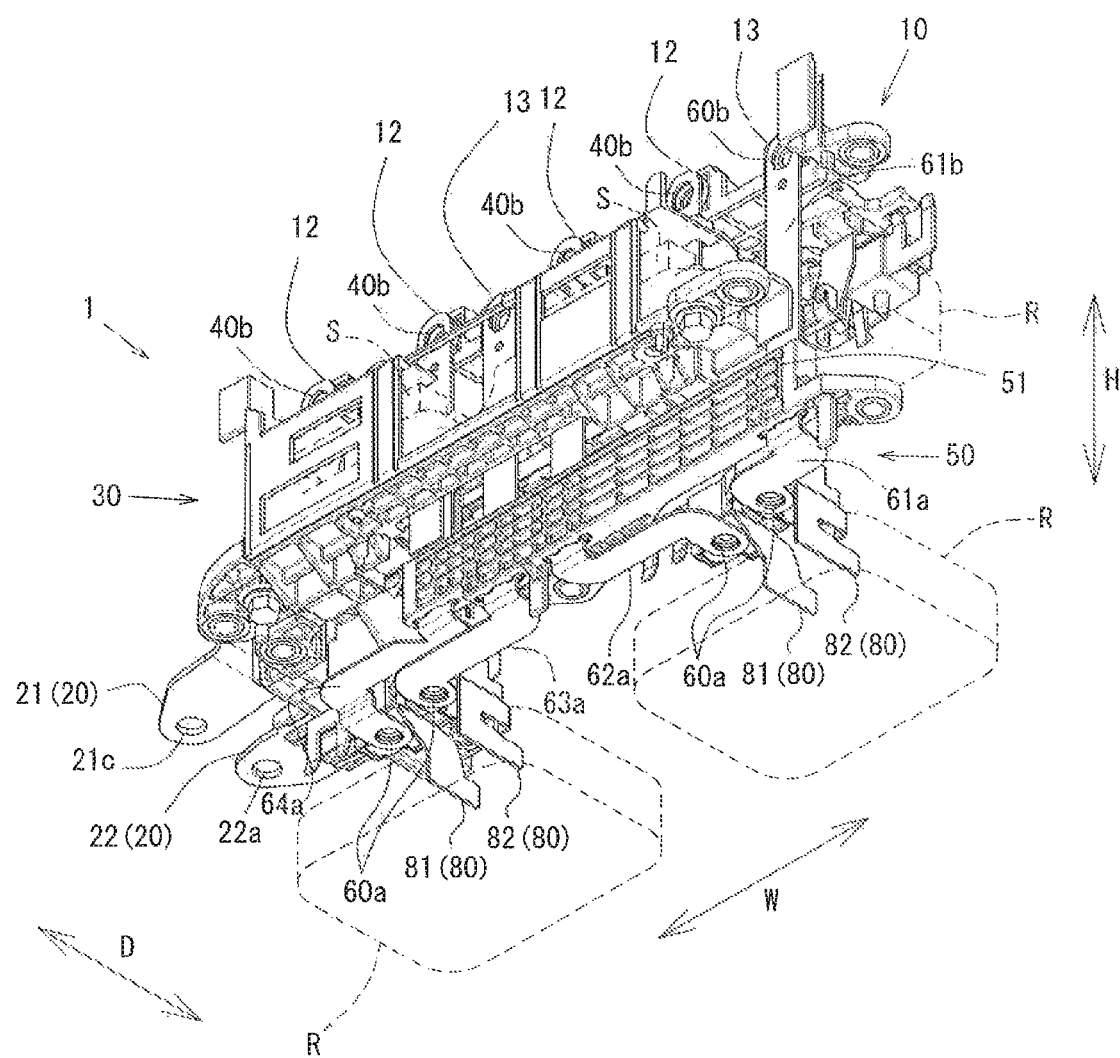
FIG. 2 is an isometric view showing a rear surface, a bottom surface and a left side surface of the terminal table unit.
Figure 3:
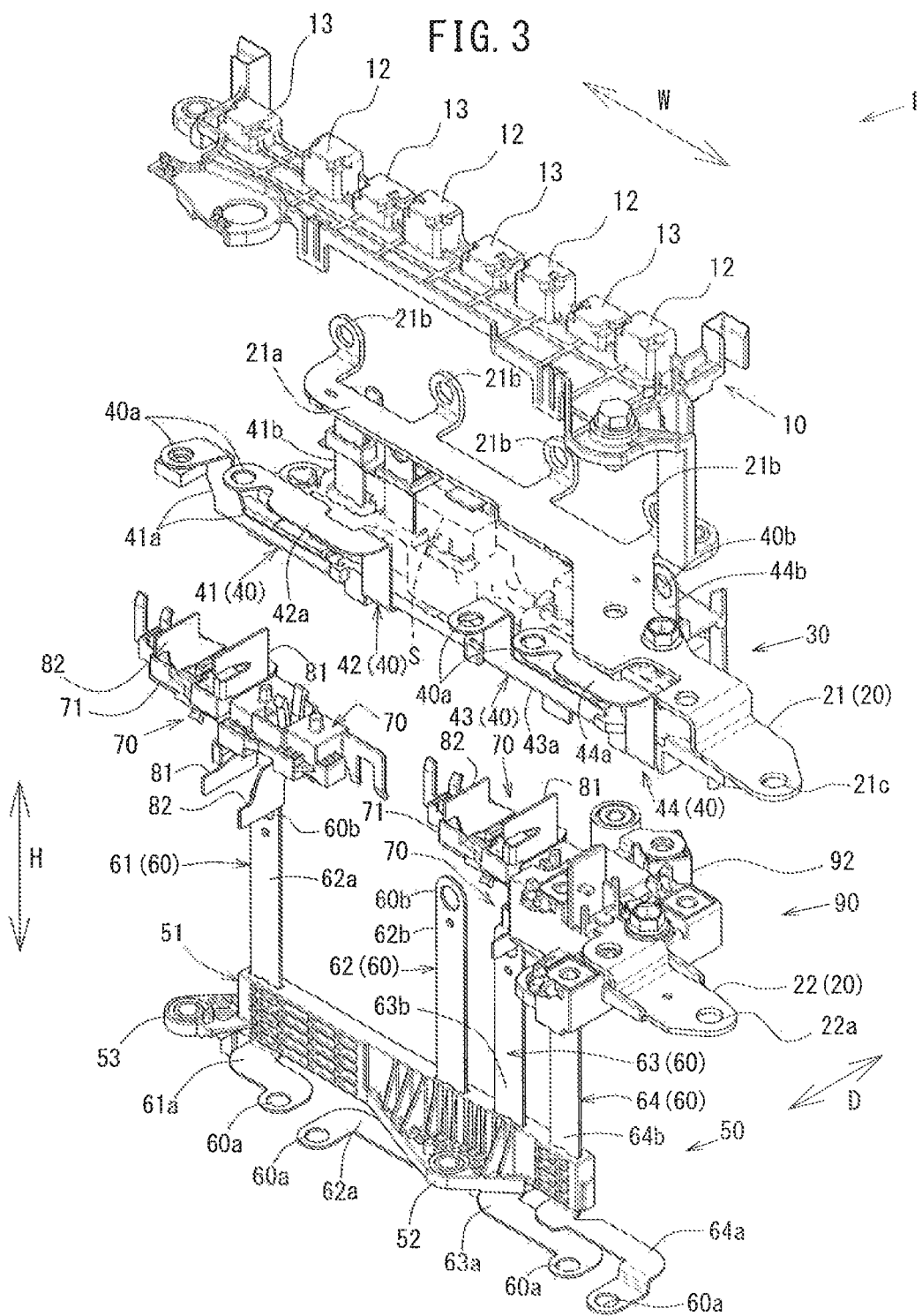
FIG. 3 is an exploded isometric view of the terminal table unit.
Figure 4:
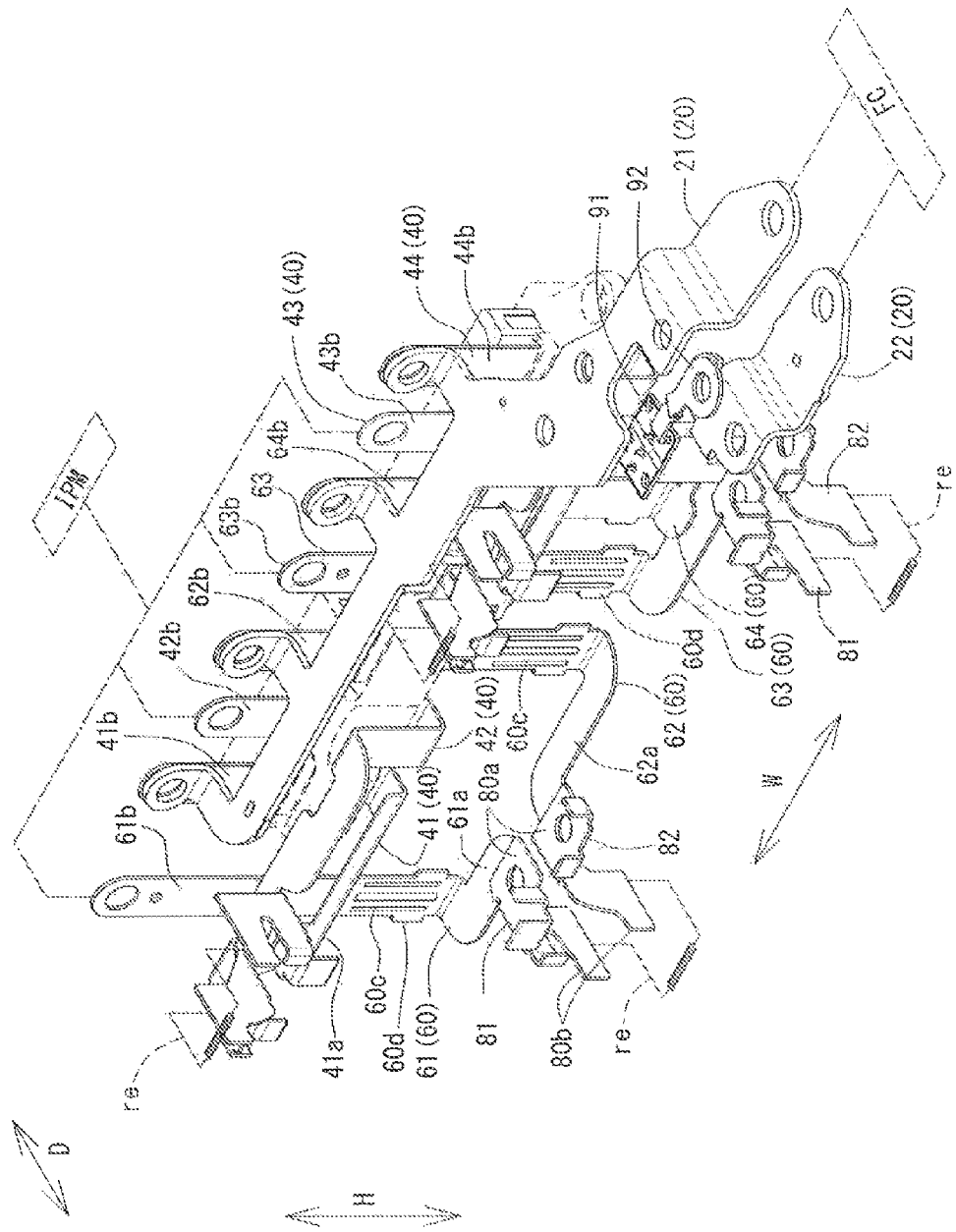
FIG. 4 is an isometric view showing busbars included in the terminal table unit.

FIG. 1 is an isometric view showing a front surface, a top surface and a right side surface of a terminal table unit 1. FIG. 2 is an isometric view showing a rear surface, a bottom surface and a left side surface of the terminal table unit 1. FIG. 3 is an exploded isometric view of the terminal table unit 1. FIG. 4 is an isometric view showing only busbars 20, 40, 60 and 80 included in the terminal table unit 1. In FIG. 1 and FIG. 2, reactor units R connectable with the terminal table unit 1 are shown with dashed lines. The busbars 40 include busbars 41, 42, 43 and 44. The busbars 60 include busbars 61, 62, 63 and 64.

Figure 5:
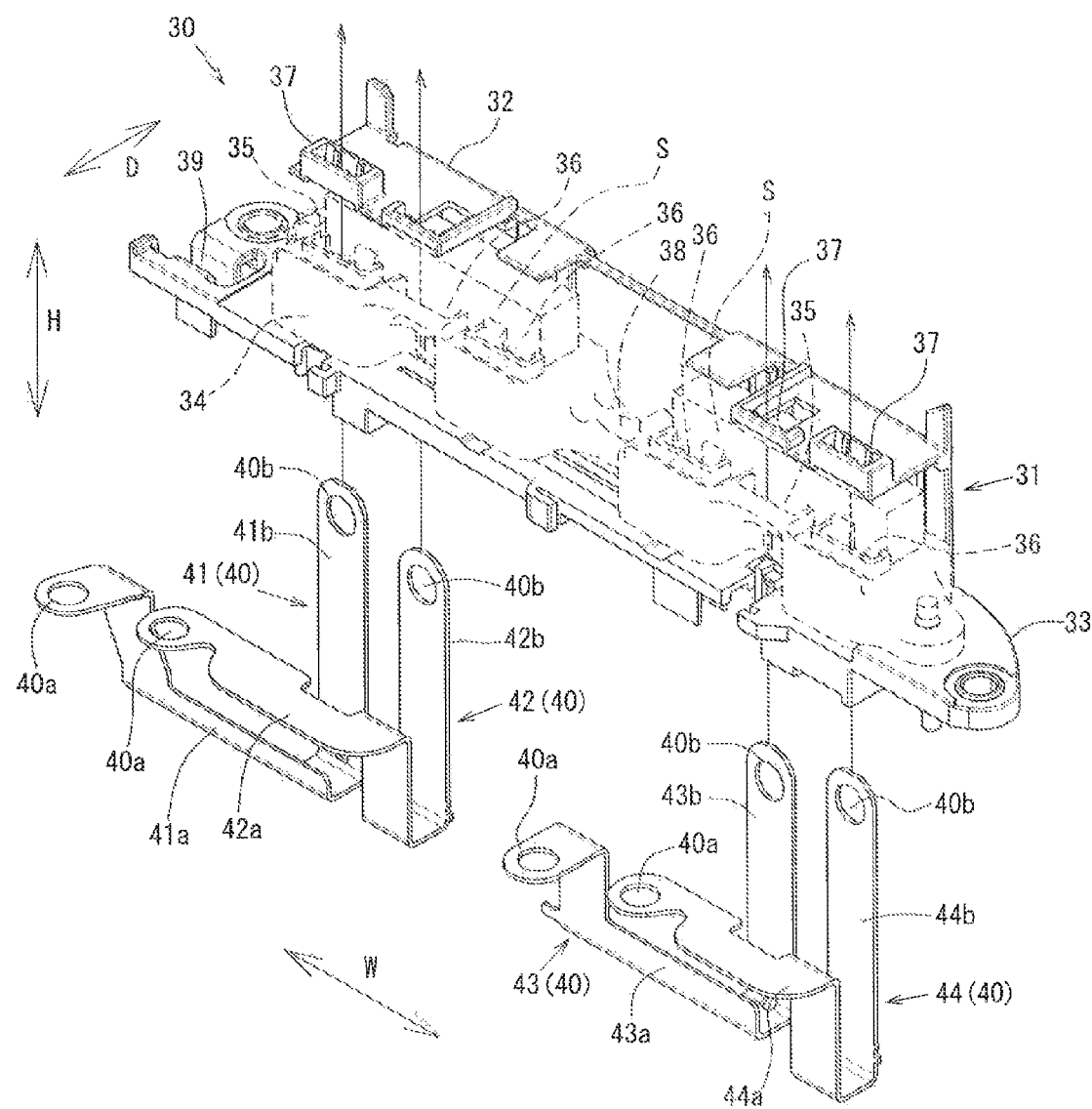
FIG. 5 is an exploded isometric view of a sensor terminal table.
Figure 6:
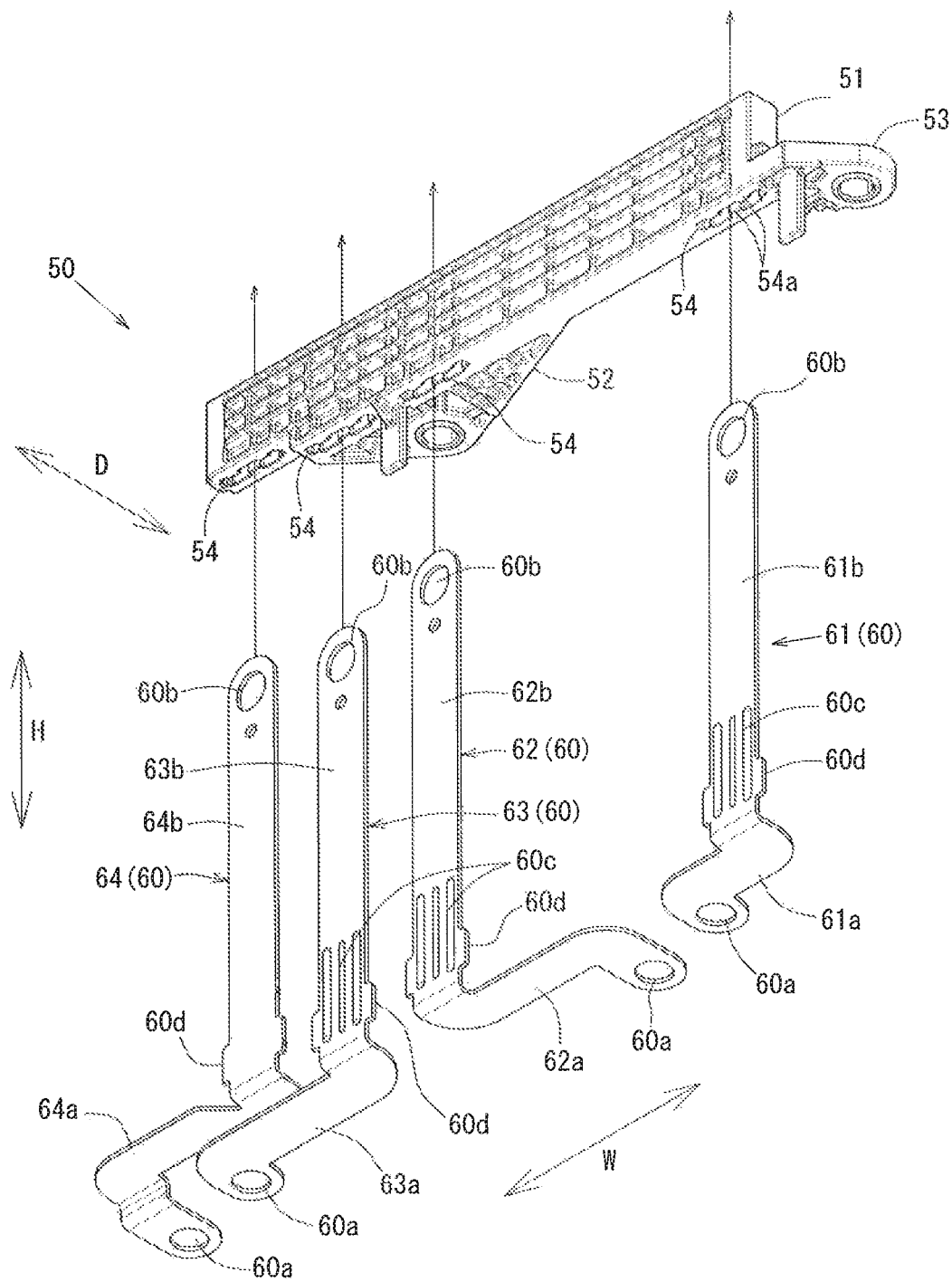
FIG. 6 is an exploded isometric view of a through-terminal table.
Figure 7A:
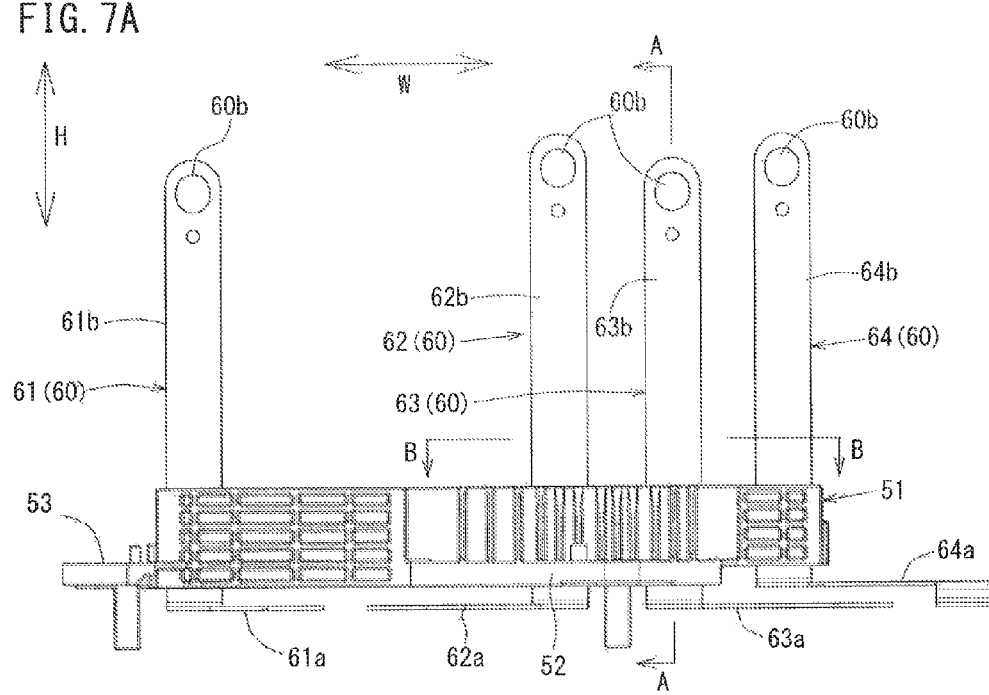
FIG. 7A provides a plan view showing the through-terminal table.
Figure 7B:
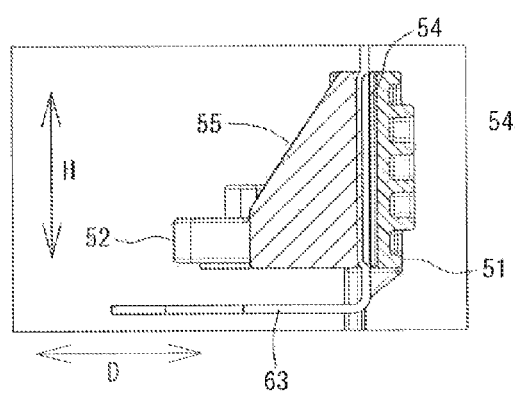
FIG. 7B provides a cross-sectional view of the through-terminal table taken along line A-A of FIG. 7A.
Figure 7C:
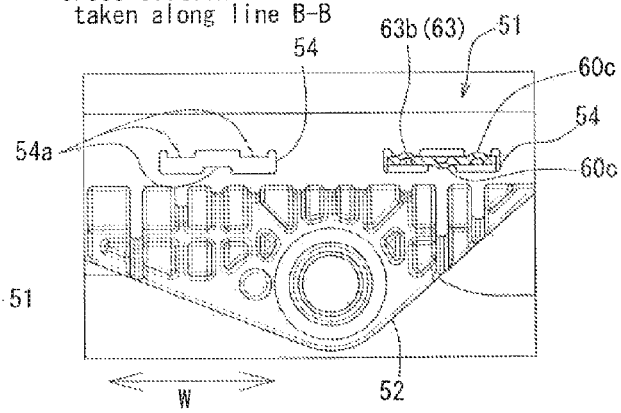
FIG. 7C provides a cross-sectional view of the through-terminal table taken along line B-B of FIG. 7A.

FIG. 5 is an exploded isometric view of a sensor terminal table 30. FIG. 6 is an exploded isometric view of a through-terminal table 50. FIGS. 7A, 7B, and 7C provide views showing the through-terminal table 50. In detail, FIG. 7A is a plan view of the through-terminal table 50, FIG. 7B is a cross-sectional view taken along line A-A in FIG. 7A, and FIG. 7C is a cross-sectional view taken along line B-B in FIG. 7A. In FIG. 2 and FIG. 3, current sensors S are shown with dashed lines, and in FIG. 5, the sensor holding portions 34 and the current sensors S are shown with dashed lines.

In this embodiment, a direction in which the plurality of busbars 40 and 60 are located side by side will be referred to as a "width direction W". A longitudinal direction of a through-pieces 61$b$, 62$b$, 63$b$ and 64$b$ of the through-busbars 60 will be referred to as a "height direction H". A direction crossing the width direction W and the height direction H substantially perpendicularly will be referred to as a depth direction D".

In this embodiment, as shown in FIG. 4, the terminal table unit 1 connects an intelligent power module (hereinafter, referred to as an "IPM") and a fuel cell FC to each other via four parallel circuits including reactors re.

As shown in FIG. 1 through FIG. 7C the terminal table unit 1 includes a top terminal table 10 including connection busbars 20, a sensor terminal table 30 including sensor busbars 40, a through-terminal table 50 including through-busbars 60, reactor securing members 70 that connect the busbars 40 and 60 and reactor units R to each other, and a diode terminal table 90 including a surge absorption diode 91. The terminal table unit 1 includes the eight busbars 40 and 60. The reactor units R are formed of a cast metal material, and easily have an error such as a processing error, a positioning error or the like. In this specification, such errors are collectively referred to simply as "errors".

The top terminal table 10 includes a to-be-connected holder 11, and the connection busbars 20.

The to-be-connected holder 11 is located so as to cover top portions of the connection busbars 20. Top connection portions 40b and 60b of the busbars 40 and 60 located side by side in the width direction W have connection cover protrusion portions 12 and 13 inserted thereinto. The connection cover protrusion portions 12 and 13 are located alternately in the width direction W. The top connection portions 40b include top connection portions 41b, 42b, 43b and 44b. The top connection portions 60b include top connection portions 61b, 62b, 63b and 64b.

The connection cover protrusion portions 13 are each a hollow protrusion portion having a rear side open, and the top connection portion 40b or 60b connectable with the IPM is inserted into the connection cover protrusion portion 13. The connection cover protrusion portions 12 are each a hollow protrusion portion having a rear side open, and the top connection portion 40b or 60b and also connection portions 21b of a first connection busbar 21, among the connection busbars 20, are respectively inserted into the connection cover protrusion portion 12.

The connection cover protrusion portions 12, into each of which the top connection portion 40b or 60b and also the connection portion 21b of the first connection busbar 21, among the connection busbars 20 are to be inserted, are formed to be about twice as high as the connection cover protrusion portions 13. Each connection cover protrusion portion 12 has a nut acting as a connection jig (not shown) accommodated in a front part thereof in the depth direction D. The nut accommodated in the connection cover protrusion portion 12 is not clearly shown.

The connection busbars 20 include the first connection busbar 21 that is lengthy in the width direction W and a second connection busbar 22 connectable with the surge absorption diode 91 of the diode terminal table 90.

The first connection busbar 21 includes a width direction busbar main body 21a lengthy in the width direction W, connection portions 21b that protrude from the busbar main body 21a rearward in the depth direction D and upward and are connectable with the top connection portions 40b and 60b, and a first outer connection portion 21c that is formed at an end of the busbar main body 21a in the width direction W and is connectable with the fuel cell FC. Four such connection portions 21b are located side by side in the width direction W at an interval twice as long as the interval at which the top connection portions 41b through 44b of the busbars 40 and the top connection portions 62a through 64a of the busbars 60 are located.

The second connection busbar 22 is located on a housing 92 of the diode terminal table 90, and includes a second outer connection portion 22a connectable with the surge absorption diode 91 and the fuel cell FC.

The first connection busbar 21 and the second connection busbar 22 are located such that when the to-be-connected holder 11 is located so as to cover the connection busbars 20, the first outer connection portion 21c of the first connection busbar 21 and the second outer connection portion 22a of the second connection busbar 22 protrude sideways in the width direction W from the to-be-connected holder 11.

The sensor terminal table 30 includes a sensor-attached holding body 31 and the sensor busbars 40.

The sensor-attached holding body 31 is lengthy in the width direction W, and includes a bottom main body 33 and a top support portion 32 that is supported by a vertical support portion provided in a rear part, in the depth direction D, of the bottom main body 33. The bottom main body 33 and the top support portion 32 form a substantially C-shaped shape as seen in a side view thereof.

The bottom main body 33 includes the two sensor holding portions 34 distanced from each other by a predetermined interval in the width direction W. The two sensor holding portions 34 each include the current sensor S. The bottom main body 33 also has an intermediate through-hole 38 and a slit-like through-hole 39. The intermediate through-hole 38 is formed between the two sensor holding portions 34 and allows a through-piece 63b of the through-busbar 63 (described later) to be inserted therethrough. The slit-like through-hole 39 is formed at a left end of the bottom main body 33 as seen in a front view and allows a through-piece 61b of the through-busbar 61 to be inserted therethrough.

Each sensor holding portion 34 has a movement through-hole 35 and securing through-holes 36. Vertical-direction portions 41b and 43b of the movable busbars 41 and 43 are inserted through the movement through-holes 35 of the sensor holding portions 34. Vertical-direction portions 42b and 44b of the secured busbars 42 and 44 and the through-pieces 61b through 64b of the through-busbars 60 are inserted through the securing through-holes 36 of the sensor holding portions 34.

The top support portion 32 has top insertion holes 37. Top parts of the vertical-direction portions 41b, 42b, 43b and 44b of the sensor busbars 40 are inserted through the top insertion holes 37.

The sensor busbars 40 include the movable busbars 41 and 43 and the secured busbars 42 and 44. The movable busbar 41, the secured busbar 42, the movable busbar 43 and the secured busbar 44 are located in this order in the width direction W from the left side as seen in a front view. The movable busbar 41 and the secured busbar 42 are close to each other, and the movable busbar 43 and the secured busbar 44 are close to each other.

The movable busbars 41 and 43 are respectively inserted through the movement through-holes 35 of the sensor-attached holding body 31, and are movable in the height direction H. The movable busbar 41 includes a width-direction portion 41a including a reactor-side connection portion 40a at a tip thereof in the width direction W, and also include the vertical-direction portion 41b. The vertical-direction portion 41b extends in the height direction H, namely, perpendicularly to the width-direction portion 41a, and includes the top connection portion 40b at a top end thereof. The movable busbar 43 includes a width-direction portion 43a including a reactor-side connection portion 40a at a tip thereof in the width direction W, and the vertical-direction portion 43b. The vertical-direction portion 43b extends in the height direction H, namely, perpendicularly to the width-direction portion 43a, and includes the top connection portion 40b at a top end thereof.

The width-direction portions 41a and 43a each have a thickness direction along the depth direction D and thus do not bend in the height direction H. The top connection portions 40b formed at the top ends of the vertical-direction portions 41b and 43b are lengthy in the height direction H.

The secured busbars 42 and 44 are respectively inserted through the securing through-holes 36 of the sensor-attached holding body 31, and are secured to the sensor-attached holding body 31. The secured busbar 42 includes an arm portion 42a including a reactor-side connection portion 40a at a tip thereof in the width direction W, and the vertical-direction portion 42b. The vertical-direction portion 42b extends in the height direction H, namely, perpendicularly to the arm portion 42a, and includes the top connection portion 40b at a top end thereof. The secured busbar 44 includes an arm portion 44a including a reactor-side connection portion 40a at a tip thereof in the width direction W, and the vertical-direction portion 44b. The vertical-direction portion 44b extends in the height direction H, namely, perpendicularly to the arm portion 44a, and includes the top connection portion 40b at a top end thereof. The arm portions 42a and 44a extending in the width direction W each have a thickness direction along the height direction H and thus are bendable in the height direction H.

The sensor terminal unit 30 including the sensor-attached holding body 31 and the sensor busbars 40 is assembled as follows. The vertical-direction portion 41b is inserted through the movement through-hole 35 formed on the left side, as seen in a front view, of the bottom main body 33 and through the leftmost top insertion hole 37, as seen in a front view, of the top support portion 32. Thus, the movable busbar 41 is attached to the sensor-attached holding body 31. The vertical-direction portion 42b is inserted through the securing through-hole 36 next to the movement through-hole 35 through which the vertical-direction portion 41b has been inserted, and through the second top insertion hole 37 from the left as seen in a front view. Thus, the secured busbar 42 is attached to the sensor-attached holding body 31. The vertical-direction portion 43b is inserted through the movement through-hole 35 formed on the right side as seen in a front view and through the second top insertion hole 37 from the right as seen in a front view. Thus, the movable busbar 43 is attached to the sensor-attached holding body 31. The vertical-direction portion 44b is inserted through the securing through-hole 36 next to the movement through-hole 35 through which the vertical-direction portion 43b has been inserted, and through the rightmost top insertion hole 37 as seen in a front view. Thus, the secured busbar 44 is attached to the sensor-attached holding body 31.

In this process, the movable busbars 41 and 43 can be attached to the sensor-attached holding body 31 so as to be movable in the height direction H with respect to the sensor-attached holding body 31.

The arm portions 42a and 44a of the secured busbars 42 and 44 attached to the sensor-attached holding body 31 so as to be secured with respect thereto are located at substantially the same level in the height direction H. The reactor-side connection portions 40a of the arm portions 42a and 44a are movable in the height direction H by the arm portions 42a and 44a bending in the height direction H.

The through-terminal table 50 includes a substantially plate-like through-holding body 51 that is lengthy in the width direction W and is high in the height direction H, and also includes the through-busbars 60.

The through-holding body 51 is substantially plate-like and is lengthy in the width direction W and high in the height direction H. The through-holding body 51 includes an attachment portion 52 and an attachment portion 53. The attachment portion 52 has an isosceles triangular shape as seen in a plan view, and protrudes forward from a bottom edge in a right part of the through-holding body 51. The attachment portion 53 is provided at a left end of the through-holding body 51 as seen in a front view and protrudes forward and leftward. The through-holding body 51 also has four securing through-holes 54 at a predetermined interval in the width direction W. The securing through-holes 54 run through the through-holding body 51 in the height direction H. Through-pieces (also referred to as "vertical-direction portions") 61b, 62b, 63b and 64b of the through-busbars 60 are inserted through the securing through-holes 54 and secured thereto.

As shown in FIG. 7B, which is an enlarged cross-sectional view taken along line B-B of FIG. 7A, each securing through-hole 54 has inner protrusion portions 54a protruding in the depth direction D from surfaces extending in the width direction W; more specifically, inward as seen in a plan view. This will be described in detail. The securing through-hole 54 has one inner protrusion portion 54a protruding inward at the center in the width direction W from the front inner surface in the depth direction D, and two inner protrusion portions 54a protruding inward from the rear inner surface in the depth direction D. The two inner protrusion portions 54a are located side by side at a predetermined interval in the width direction W.

The inner protrusion portions 54a are formed in each securing through-hole 54 over the entirety length thereof. In FIG. 7B, the right securing through-hole 54 is shown as having the through-piece 63b of the through-busbar 63 (described later) inserted therethrough. In order to clearly show the inner protrusion portions 54a, the through-piece 62b is not shown in the left securing through-hole 54.

The through-busbars 61 through 64 are inserted through the securing through-holes 54 of the through-holding body 51, and are secured with respect to the through-holding body 51. The through-busbar 61 includes a through-busbar arm portion 61a and the vertical-direction portion 61b. The through-busbar arm portion 61a includes a reactor-side connection portion 60a at a tip thereof in the width direction W. The vertical-direction portion 61b extends in the height direction H, namely, perpendicularly to the through-busbar arm portion 61a and includes the top connection portion 60b at a top end thereof. Similarly, the through-busbars 62 through 64 respectively include through-busbar arm portions 62a through 64a and the vertical-direction portions 62b through 64b. The through-busbar arm portions 62a through 64a include reactor-side connection portions 60a at tips thereof in the width direction W and extend in the width direction W. The vertical-direction portions 62b through 64b extend in the height direction H, namely, perpendicularly to the through-busbar arm portions 62a through 64a and include the top connection portions 60b at top ends thereof.

The through-busbar arm portion 61a of the through-busbar 61 is formed to be shorter than any of the through-busbar arm portions 62a through 64a of the through-busbars 62 through 64. The through-busbar arm portions 61a, 63a and 64a of the through-busbars 61, 63 and 64 extend rightward in the width direction W as seen in a front view, whereas the through-busbar arm portion 62a of the through-busbar 62 extends leftward in the width direction W as seen in a front view.

The through-busbar arm portions 61a through 64a extending in the width direction W each have a thickness direction along the height direction H and thus are bendable in the height direction H. The vertical-direction portions 61b through 64b of the through-busbars 61 through 64 each include side protrusion portions 60d at bases thereof. The side protrusion portions 60d protrude sideways in the width direction W from side surfaces of the vertical-direction portions 61b through 64b.

The vertical-direction portions 61b through 63b of the through-busbars 61 through 63 each include three protrusion ribs 60c that extend in the height direction H and protrude in a thickness direction (depth direction D). Among the three protrusion ribs 60c, the central rib 60c and the side ribs 60c protrude in opposite directions in the thickness direction. The three protrusion ribs 60c protrude so as to face the corresponding inner protrusion portions 54a formed in the securing through-hole 54. The protrusion ribs 60c are each formed to have a length corresponding to the height of the through-holding body 51.

The through-terminal table 50 including the through-holding body 51 and the through-busbars 60 are assembled as follows. The through-piece 61b is inserted through the securing through-hole 54 at the left end, as seen in a front view, of the through-holding body 51. Thus, the through-busbar 61 is attached to the through-holding body 51. The through-pieces 62b through 64b of the through-busbars 62 through 64 are respectively inserted through the three securing through-holes 54 that are located on the right side and away from the securing through-hole 54 through which the through-piece 61b has been inserted. In this process, the through-piece 61b through 64b are inserted until the side protrusion portions 60d of the through-busbars 60 (61 through 64) are inserted into bottom ends of the securing through-holes 54, and thus are secured as being inserted.

When the through-busbars 61 through 63 including the protrusion ribs 60c are inserted into the securing through-holes 54, the inner protrusion portions 54a formed on the inner surface of the through-holes 54 and the protrusion ribs 60c respectively face each other, and are firmed engaged with each other substantially over the entire length of the through-holding body 51. Therefore, the through-busbars 61 through 63 having the vertical-direction portions 61b through 63b inserted into the through-holes 54 are secured with certainty.

The reactor securing members 70 each include a housing 71 (see FIG. 3) and a set of reactor busbars 80 (first reactor busbar 81 and second reactor busbar 82) located inside the housing 71.

As shown in FIG. 4, the first reactor busbars 81 and the second reactor busbars 82 each include a flat connection portion 80a and a welding connection portion 80b. The flat connection portion 80a is connected with the reactor-side connection portion 40a or 60a of the busbar 40 or 60. The welding connection portion 80b extends vertically from the flat connection portion 80a and is weldable with the reactor re included in the reactor R.

The first reactor busbar 81 and the second reactor busbar 82 are located such that the welding connection portions 80b face each other and are away from each other by a predetermined distance in the width direction W. The first reactor busbar 81 and the second reactor busbar 82 are located in the housing 71 such that the welding connection portions 80b protrude.

The reactor securing members 70 connectable with the reactor-side connection portions 60a of the through-busbars 60 (lower reactor securing members 70 in FIG. 1 through FIG. 4) are located such that the welding connection portions 80b protrude downward. The reactor securing members 70 connectable with the reactor-side connection portions 40a of the sensor busbars 40 (upper reactor securing members 70 in FIG. 1 through FIG. 4) are located such that the welding connection portions 80b protrude upward. The flat connection portions 80a and the reactor-side connection portions 40a and 60a are engaged with each other via connection jigs (not shown). Thus, the reactor securing members 70 are attached to the busbars 40 and 60.

The diode terminal table 90 includes the surge absorption diode 91 and the housing 92 accommodating the surge absorption diode 91. The diode terminal table 90 is located such that the second connection busbar 22 protrudes sideways in the width direction W.

The top terminal table 10, the sensor terminal table 30, the through-terminal table 50, the reactor securing members 70, and the diode terminal table 90 having such a structure are assembled as follows. The through-pieces 61b through 64b of the through-terminal table 50 are respectively inserted through the slit-like through-hole 39, the securing through-hole 36 to the right of the securing through-hole 36 through which the vertical-direction portion 42b has been inserted, the intermediate through-hole 38, and the securing through-hole 36 to the right of the intermediate through-hole 38 as seen in a front view. Thus, the sensor terminal table 30 and the through-terminal table 50 are assembled together. In this process, the top connection portions 40b of the sensor busbars 40 and the top connection portions 60b of the through-busbars 60 are located at substantially the same level in the height direction H above the top support portion 32 and side by side in the width direction W.

In this state, the top terminal table 10 is assembled with the sensor terminal table 30 and the through-terminal table 50. Inside the connection cover protrusion portions 12, the top connection portions 40b and 60b of the movable busbar 41, the through-busbar 62, the through-busbar 64 and the secured busbar 44 are connected with the connection portions 21b of the first connection busbar 21 via connection jigs inserted through the top connection portions 40b and 60b and the connection portions 21b.

Inside the connection cover protrusion portions 13, the top connection portions 40b and 60b of the through-busbar 61, the secured busbar 42, the through-busbar 63, and the movable busbar 43 are connected with the IPM so as to be conductive therewith.

The reactor securing members 70 connected with the reactors re located in the reactor units R that are located at predetermined positions are assembled, at four predetermined positions, with the sensor terminal table 30 and the through-terminal table 50 in such an assembled state. The reactor busbars 80 in the reactor securing members 70 are connected with the reactor-side connection portions 40a of the movable busbar 41 and the secured busbar 42, the reactor-side connection portions 40a of the movable busbar 43 and the secured busbar 44, the reactor-side connection portions 60a of the through-busbar 61 and the through-busbar 62, and the reactor-side connection portions 60a of the through-busbar 63 and the through-busbar 64.

The diode terminal table 90 is assembled with, and the second connection busbar 22 is attached to, the top terminal table 10 which as been assembled with the other tables as described above. The first connection busbar 21 and the second connection busbar 22 are connected with the fuel cell FC via the outer connection portions 21c and 22a. Thus, the terminal table unit 1 is completed.

As shown in FIG. 4, the terminal table unit 1 having such a structure allows circuits to be formed by connecting the IPM and the fuel cell FC to each other via the four reactors re that are located side by side.

This will be described in detail. The through-busbar 61 including the top connection portion 60b connected with the IPM, the first reactor busbar 81, the reactor re, the second reactor busbar 82, and the through-busbar 62 including the top connection portion 60b connected with the connection portion 21b are connected with the fuel cell FC via the first connection busbar 21, and thus form a circuit.

Similarly, the secured busbar 42 including the top connection portion 40b connected with the IPM, the second reactor busbar 82, the reactor re, the first reactor busbar 81, and the movable busbar 41 including the top connection portion 40b connected with the connection portion 21b are connected with the fuel cell FC via the first connection busbar 21, and thus form a circuit. The through-busbar 63 including the top connection portion 60b connected with the IPM, the first reactor busbar 81, the reactor re, the second reactor busbar 82, and the through-busbar 64 including the top connection portion 60b connected with the connection portion 21b are connected with the fuel cell FC via the first connection busbar 21, and thus form a circuit. The movable busbar 43 including the top connection portion 40b connected with the IPM, the second reactor busbar 82, the reactor re, the first reactor busbar 81, and the secured busbar 44 including the top connection portion 40b connected with the connection portion 21b are connected with the fuel cell FC via the first connection busbar 21, and thus form a circuit.

In this manner, the IPM and the fuel cell FC are connected to each other by the sensor busbars 40 and the through-busbars 60 via the four reactors re located side by side, namely, via the four parallel circuits each including the reactor re.

The sensor terminal table 30 includes the plurality of sensor busbars 40 and the sensor-attached holding body 31 that holds the plurality of sensor busbars 40. The sensor busbars 40 each include the reactor-side connection portion 40a on the bottom side in the height direction H and the top connection portion 40b on the top side in the height direction H. The reactor-side connection portion 40a is connected with the reactor busbar 80 of the reactor securing member 70 that is connected with the reactor re included in the reactor unit R having an error. The top connection portion 40b is connectable with the IPM or the fuel cell FC. In the sensor terminal table 30, the movable busbars 41 and 43, among the plurality of sensor busbars 40, are attached to the sensor-attached holding body 31 so as to be movable in the height direction D with respect to the sensor-attached holding body 31. Owing to this, the plurality of sensor busbars 40 are connected certainly and easily with the reactor busbars 80 of the reactor securing members 70 connected with the reactors re included in the reactor units R.

This will be described in detail. Circuits may be formed by connecting the sensor busbars 40 with the reactor busbars 80 of the reactor securing members 70 connected with the reactors re included in the reactor units R having an error. In this case, the movable busbars 41 and 43 attached to the sensor-attached holding body 31 so as to be movable in the height direction H with respect to the sensor-attached holding body 31 may be moved in correspondence with the error. Owing to this, the connection is made easily.

In addition to the movable busbars 41 and 43, the secured busbars 42 and 44 may be attached to the sensor-attached holding body 31 so as not to be movable. The secured busbars 42 and 44 respectively include the arm portions 42a and 44a on the bottom side in the height direction H. The arm portions 42a and 44a extend in the width direction W and are bendable in the height direction H. The arm portions 42a and 44a each have the reactor-side connection portion 40a at the tip thereof. Owing to this, the plurality of sensor busbars 40 (41, 42, 43, 44) are connected more certainly and easily with the reactor busbars 80 of the reactor securing members 70 connected with the reactors re included in the reactor units R having an error.

This will be described in detail. Circuits may be formed by connecting the sensor busbars 40 with the reactor busbars 80 of the reactor securing members 70 connected with the reactors re included in the reactor units R having an error. In this case, the movable busbars 41 and 43 attached to the sensor-attached holding body 31 so as to be movable in the height direction H with respect to the sensor-attached holding body 31 may be moved in correspondence with the error, and also the arm portions 42a and 44a of the secured busbars 42 and 44 may be bent in correspondence with the error. Owing to this, the connection is made more easily and certainly.

The movable busbars 41 and 43 may be moved with respect to the sensor-attached holding body 31 in correspondence with the error, and in addition, the arm portions 42a and 44a of the secured busbars 42 and 44 may be bent in correspondence with the error. In this case, the distance by which the movable busbars 41 and 43 are moved or the amount by which the arm portions 42a and 44a are bent is smaller than that in the case where the movable busbars 41 and 43 are moved but the arm portions 42a and 44a are not bent, or in the case where the arm portions 42a and 44a are bent but the movable busbars 41 and 43 are not moved. Therefore, the connection is made more easily and certainly.

In this manner, the reactor-side connection portions 40a of the movable busbar 41 and the secured busbar 42, the reactor-side connection portions 40a of the movable busbar 43 and the secured busbar 44, the reactor-side connection portions 60a of the through-busbars 61 and 62, and the reactor-side connection portions 60a of the through-busbars 63 and 64 are connected with the reactors re included in the reactor units R having an error via the reactor busbars 80 of the reactor securing members 70. Owing to this, the plurality of busbars 40 and 60 are connected more certainly and easily. Thus, circuits having a stable conductivity are realized.

This will be described in detail. As described above, circuits may be formed by connecting the sensor busbars 40 and 60 with the reactor busbars 80 of the reactor securing members 70 connected with the reactors re included in the reactor units R having an error. In this case, the movable busbars 41 and 43 attached to the sensor-attached holding body 31 so as to be movable in the height direction H with respect to the sensor-attached holding body 31 may be moved in correspondence with the error, and also the arm portions 42a and 44a of the secured busbars 42 and 44 and the through-busbar arm portions 61a through 64a of the through-busbars 60 may be bent in correspondence with the error. Owing to this, the busbars 40 and 60 are connected more certainly and easily. Therefore, the top connection portions 40b and 60b are connected with the reactors re via the reactor busbars 80 of the reactor securing members 70 without any load. Thus, circuits having a stable conductivity are realized.

The top connection portions 40*b* of the movable busbars 41 and 43 may be holes running in the depth direction D and lengthy in the height direction H. In this case, the plurality of sensor busbars 40 are connected more easily with the reactor busbars 80 of the reactor securing members 70 connected with the reactors re included in the reactor units R having an error.

This will be described in detail. The movable busbars 41 and 43 may be connected with the reactor busbars 80 of the reactor securing members 70 connected with the reactors re included in the reactor units R having an error. In this case also, the connection jigs are inserted through the lengthy holes. Owing to this, the connection is made certainly and easily.

The sensor-attached holding body 31 may include the current sensors S that measure an electric current flowing the sensor busbars 40. In this case, the electric current flowing in the busbars 40 and 60 connected with the reactors re via the reactor busbars 80 of the reactor securing members 70 is detected certainly.

The terminal table unit 1 includes the through-terminal table 50 and the sensor terminal table 30. The through-terminal table 50 includes the through-busbars 60 extending in the height direction H and the through-holding body 51 that hold the plurality of through-busbars 60. The through-busbars 60 include through-pieces 61*b* through 64*b* running through the through-holding body 51, and the through-busbar arm portions 61*a* through 64*a* that extend in the width direction W below the through-pieces 61*b* through 64*b* in the height direction H and are bent in the height direction H. The through-pieces 61*b* through 64*b* each include the top connection portion 60*b* at the top end thereof in the height direction H. The through-busbar arm portions 61*a* through 64*a* each include the reactor-side connection portion 60*a* at the tip thereof. Even in the case where the terminal table unit 1 includes many circuits, the plurality of busbars 40 and 60 are located without interference, and are connected easily and certainly with the reactor busbars 80 connected with the reactors re included in the reactors R having an error.

The through-pieces 61*b* through 63*b* include protrusion ribs 60*c* protruding in the thickness direction. The protrusion ribs 60*c* are in the securing through-holes 54 in the above-described assembled state. The securing through-holes 54 of the through-holding body 51 allow the through-pieces 61*b* through 63*b* to be inserted therethrough. The securing through-holes 54 each have the inner protrusion portions 54*a* protruding inward from the inner surfaces thereof. Owing to this, the through-pieces 61*b* through 63*b* of the through-busbars 60 are merely inserted through the securing through-holes 54 of the through-holding body 51, so that the protrusion ribs 60*c* of the through-pieces 61*b* through 63*b* and the inner protrusion portions 54*a* formed in the securing through-holes 54 increase an insertion load. This prevents the through-pieces 61*b* through 63*b* from coming off from the securing through-holes 54.

The terminal table unit 1 includes the top terminal table 10 including the connection portions 21*b* connected with the top connection portions 40*b* and the connection busbars 20 that conductively connect the connection portions 21*b* with the IPM or the fuel cell FC. Owing to this, the top connection portions 40*b* are connected easily and certainly with the IPM or the fuel cell FC via the top terminal table 10.

The through-terminal table 50 is located below the sensor terminal table 30 in the height direction H, and the first connection busbar 21 is located above the sensor terminal table 30 in the height direction H. The sensor-attached holding body 31 of the sensor terminal table 30 has through-holes 36, 38 and 39 through which the through-pieces 61*b* through 64*b* of the through-busbars 60 are inserted. Owing to this, the plurality of busbars 40 and 60 are connected certainly and easily with the reactors re via the reactor busbars 80 of the reactor securing members 70. Thus, many circuits are formed in a compact manner.

This will be described in detail. The through-terminal table 50, the sensor terminal table 30, and the top terminal table 10, which connect the plurality of busbars 40 and 60 with the reactors re via the reactor busbars 80 of the reactor securing members 70 certainly and easily, are located in this order from the bottom to the top in the height direction H. In addition, the through-pieces 61*b* through 64*b* are inserted through the through-holes 36, 38 and 39 formed in the sensor-attached holding body 31 of the sensor terminal table 30. Owing to this, the terminal table unit 1 is compact.

The first connection target according to the present invention corresponds to the reactor re in the embodiment; and similarly, the one-side connection portion corresponds to the reactor-side connection portion 40*a* or 60*a*;

the other connection target corresponds to the IMP or the fuel cell FC;

the other-side connection portion corresponds to the top connection portion 40*b* or 60*b*;

the busbar corresponds to the sensor busbar 40;

the holding body corresponds to the sensor-attached holding body 31;

the terminal table corresponds to the sensor terminal table 30;

the first direction corresponds to the height direction H;

the second direction corresponds to the width direction W;

the third direction corresponds to the depth direction D;

the through-busbar holding body corresponds to the through-holding body 51;

the through-hole corresponds to the securing through-hole 54;

the protrusion portion corresponds to the inner protrusion portion 54*a*;

the to-be-connected portion corresponds to the connection portion 21*b*;

the to-be-connected terminal table corresponds to the top terminal table 10;

the one side corresponds to the bottom side in the height direction H;

the other side corresponds to the top side in the height direction H; and the first-direction through-hole corresponds to the securing through-hole 36.

However, the present invention is not limited to the structure of the above-described embodiment, and is applicable based on the technological idea shown by the claims and may be realized in many embodiments. For example, the top connection portions 40*b* and 60*b* may be connected with the connection portions 21*b* by welding or caulking.

In the above description, the terminal table unit 1 includes the through-terminal table 50, the sensor terminal table 30, and the top terminal table 10 that are assembled in this order from the bottom in the height direction H. Alternatively, the terminal table unit 1 may include the through-terminal table 50, the sensor terminal table 30, and the top terminal table 10 that are assembled in this order in the depth direction D.

In the above description, the through-terminal table 50 includes the four through-busbars 60, and the sensor terminal table 30 includes the four through-busbars 40, so that the terminal table unit 1 includes the eight busbars 40 and 60 in total. The number of the busbars 40 and 60 is not limited to this, and many more busbars may be provided as long as the number of the busbars is an even number.

DESCRIPTION OF THE REFERENCE NUMERALS

1 . . . Terminal table unit
20 . . . Connection busbar
21 . . . First connection busbar
21*b* . . . Connection portion
30 . . . Sensor terminal table
31 . . . Sensor-attached holding body
40 . . . Sensor busbar
40*b* . . . Top connection portion
41, 43 . . . Movable busbar
42, 44 . . . Secured busbar
42*a*, 44*a* . . . Arm portion
50 . . . Through-terminal table
51 . . . Through-holding body
54 . . . Securing through-hole
54*a* . . . Inner protrusion portion
60 . . . Through-busbar
60*c* . . . Protrusion rib
61*a*-64*a* Through-busbar arm portion
61*b*-64*b* . . . Through-piece
D . . . Depth direction
FC . . . Fuel cell
H . . . Height direction
re . . . Reactor
S . . . Current sensor
W . . . Width direction

What is claimed is:

1. A terminal module, comprising:
   a plurality of busbars each including a one-side connection portion provided on one side and connected with a first connection target and an other-side connection portion provided on the other side and connected with another connection target; and
   a holding body holding the plurality of busbars;
   wherein:
   at least one of the plurality of busbars is a movable busbar attached to the holding body so as to be movable in a first direction with respect to the holding body, the one-side connection portion of the movable busbar being connectable with the first connection target,
   the other-side connection portion is a connection through-hole allowing a connection jig to be inserted therethrough, and
   the connection through-hole of the movable busbar is an elongated hole that is elongated in the first direction and runs through the movable busbar in a third direction different from the first direction and the second direction.

2. A terminal module according to claim 1, wherein:
   another busbar among the plurality of busbars is a secured busbar attached to the holding body so as not to be movable, and
   the secured busbar includes an arm portion on the one side, the arm portion extending in a second direction crossing the first direction, being bendable in the first direction, and including the one-side connection portion at a tip thereof.

3. A terminal module according to claim 2, wherein the one-side connection portion of the movable busbar and the one-side connection portion of the secured busbar are connected with the first connection target to form a circuit.

4. A terminal module according to claim 1, wherein the holding body includes a current sensor measuring an electric current flowing in the busbar.

5. A terminal module unit, comprising:
   a terminal module according to claim 1; and
   a through-terminal module including a plurality of through-busbars extending in a first direction and a through-busbar holding body holding the plurality of through-busbars;
   wherein:
   the plurality of through-busbars each include a through-piece inserted through the through-busbar holding body, and a through-busbar arm portion provided on one side with respect to the through-piece, the through-busbar arm portion extending in a second direction different from the first direction and being bendable in the first direction, and
   the through-piece includes an other-side connection portion on the other side, and the through-busbar arm portion includes a one-side connection portion at a tip thereof.

6. The terminal module unit according to claim 5, wherein:
   the through-piece includes a protrusion rib protruding in a thickness direction, the protrusion rib being provided so as to be in a through-hole that is formed in the through-busbar holding body and allows the through-piece to be inserted therethrough, and
   the through-hole has a protrusion portion protruding inward from an inner surface thereof.

7. The terminal module unit according to claim 5, further comprising a to-be-connected terminal module including to-be-connected portions connected with the other-side connection portions of the busbars and the other-side connection portions of the through-busbars, and also including a connection busbar conductively connecting the to-be-connected portions and another connection target to each other.

8. The terminal module unit according to claim 7, wherein:
   the through-terminal module is located on one side with respect to the terminal module, and the to-be-connected terminal module is located on the other side with respect to the terminal module, and
   the holding body of the terminal module has first-direction through-holes respectively allowing the through-pieces of the through-busbars to be inserted therethrough in the first direction.

9. A terminal module unit, comprising:
   a terminal module comprising
      a plurality of busbars each including a one-side connection portion provided on one side and connected with a first connection target and an other-side connection portion provided on the other side and connected with another connection target, and
      a holding body holding the plurality of busbars;
   wherein at least one of the plurality of busbars is a movable busbar attached to the holding body so as to be movable in a first direction with respect to the holding body, the one-side connection portion of the movable busbar being connectable with the first connection target; and
   a through-terminal module including a plurality of through-busbars extending in a first direction and a through-busbar holding body holding the plurality of through-busbars;

wherein:
the plurality of through-busbars each include a through-piece inserted through the through-busbar holding body, and a through-busbar arm portion provided on one side with respect to the through-piece, the through-busbar arm portion extending in a second direction different from the first direction and being bendable in the first direction, and the through-piece includes an other-side connection portion on the other side, and the through-busbar arm portion includes a one-side connection portion at a tip thereof.

10. The terminal module unit according to claim 9, wherein:
the through-piece includes a protrusion rib protruding in a thickness direction, the protrusion rib being provided so as to be in a through-hole that is formed in the through-busbar holding body and allows the through-piece to be inserted therethrough, and the through-hole has a protrusion portion protruding inward from an inner surface thereof.

11. The terminal module unit according to claim 9, further comprising a to-be-connected terminal module including to-be-connected portions connected with the other-side connection portions of the busbars and the other-side connection portions of the through-busbars, and also including a connection busbar conductively connecting the to-be-connected portions and another connection target to each other.

12. The terminal module unit according to claim 11, wherein:
the through-terminal module is located on one side with respect to the terminal module, and the to-be-connected terminal module is located on the other side with respect to the terminal module, and the holding body of the terminal module has first-direction through-holes respectively allowing the through-pieces of the through-busbars to be inserted therethrough in the first direction.

* * * * *